United States Patent
Saiki et al.

(10) Patent No.: US 7,651,643 B2
(45) Date of Patent: Jan. 26, 2010

(54) POLARIZER, METHOD FOR PRODUCING SAME, POLARIZING PLATE, OPTICAL FILM, AND IMAGE DISPLAY

(75) Inventors: Yuuji Saiki, Ibaraki (JP); Hideyuki Usui, Ibaraki (JP); Takahisa Konishi, Ibaraki (JP); Takemichi Yoshida, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 462 days.

(21) Appl. No.: 10/553,958

(22) PCT Filed: Apr. 19, 2004

(86) PCT No.: PCT/JP2004/005548

§ 371 (c)(1),
(2), (4) Date: Oct. 19, 2005

(87) PCT Pub. No.: WO2004/095091

PCT Pub. Date: Nov. 4, 2004

(65) Prior Publication Data

US 2006/0227423 A1    Oct. 12, 2006

(30) Foreign Application Priority Data

Apr. 21, 2003  (JP) ............... 2003-115650

(51) Int. Cl.
 *B29D 11/00* (2006.01)
(52) U.S. Cl. ............ 264/1.34; 264/1.35; 264/2.6; 264/2.7
(58) Field of Classification Search .......... 264/1.1, 264/1.34, 2.6, 2.7, 288.4, 1.35
See application file for complete search history.

(56) References Cited

U.S. PATENT DOCUMENTS

| | | | |
|---|---|---|---|
| 6,337,369 | B1 | 1/2002 | Isozaki |
| 2003/0137732 | A1 * | 7/2003 | Sugino et al. ............ 359/491 |
| 2006/0098137 | A1 * | 5/2006 | Kameyama et al. ........ 349/96 |

FOREIGN PATENT DOCUMENTS

| | | |
|---|---|---|
| JP | 54-16575 | 2/1979 |
| JP | 61-175602 | 8/1986 |
| JP | 9-292524 A | 11/1997 |
| JP | 10-142422 A | 5/1998 |
| JP | 10-160935 | 6/1998 |
| JP | 10-170721 | 6/1998 |
| JP | 10-319236 A | 12/1998 |
| JP | 2002-35512 | 2/2002 |
| JP | 2002-144406 A | 5/2002 |
| JP | 2002-169024 | 6/2002 |
| JP | 2002-174726 A | 6/2002 |
| JP | 2002-214436 | 7/2002 |
| JP | 2002-258042 | 9/2002 |
| JP | 2002-333522 | 11/2002 |
| JP | 2003-29043 | 1/2003 |
| JP | 2003-121644 A | 4/2003 |
| JP | 2003-227934 | 8/2003 |
| JP | 2003-279748 A | 10/2003 |

OTHER PUBLICATIONS

International Preliminary Report on Patentability of corresponding International application No. PCT/JP2004/005548 mailed Mar. 9, 2006.
Japanese Office Action issued on Oct. 10, 2008 for corresponding Japanese Patent Application No. 2004-119759.
Japanese Office Action dated Jan. 7, 2009, issued in corresponding Japanese Patent Application No. 2004-119759.

* cited by examiner

*Primary Examiner*—Mathieu D. Vargot
(74) *Attorney, Agent, or Firm*—Westerman, Hattori, Daniels & Adrian, LLP

(57) ABSTRACT

A polarizer of the invention comprises a polyvinyl alcohol-based film which is at least dyed with at least iodine and uniaxially stretched, having a single transmittance of 43% or more, a polarizing efficiency of 99.9% or more, and a dichroic ratio of 30 or more, wherein the dichroic ratio is calculated from a parallel transmittance (Tp) and a crossed transmittance (Tc) at a wavelength of 440 nm, and have good hue.

3 Claims, No Drawings

POLARIZER, METHOD FOR PRODUCING SAME, POLARIZING PLATE, OPTICAL FILM, AND IMAGE DISPLAY

TECHNICAL FIELD

The invention relates to a polarizer and a method of manufacturing the same. The invention also relates to a polarizing plate using the polarizer and to an optical film using the polarizing plate or the like. The invention further relates to an image display such as a liquid crystal display, an organic electro-luminescent (EL) display and a Plasma Display Panel (PDP) using the polarizing plate, the optical film, or the like.

BACKGROUND ART

Conventionally, image displays such as liquid crystal displays use polarizing plates comprising a laminate of a polarizer and a protective film such as a triacetyl cellulose film. The polarizer is produced by dyeing a polyvinyl alcohol-based film with a dichroic dye such as iodine and then stretching it in an aqueous boric acid solution. The hue of the polarizing plate significantly influences the due of liquid crystal displays.

Conventional polarizing plates, however, have low transmittance at wavelengths from 400 nm to 500 nm with respect to the transmission spectrum in the parallel Nicol configuration and thus show a yellow hue in the parallel Nicol configuration. On the other hand, high transmittance is performed at wavelengths from 400 nm to 500 nm with respect to the transmission spectrum in the crossed Nicol configuration and thus shows a blue hue in the crossed Nicol configuration. Thus, there has been a problem that conventional liquid crystal displays using such polarizing plates can become slightly yellow when white viewing and can become blue when black viewing.

As a method of producing neutral gray display when white viewing or black viewing, a method is disclosed including treating an iodine-dyed, uniaxially-stretched, polyvinyl alcohol-based film in an aqueous boric acid solution containing a specific amount of potassium iodide and controlling the treatment temperature in each step (for example, Japanese Patent Application Laid-Open (JP-A) No. 2002-169024). According to the method as disclosed in the publication, however, the resulting hue is not sufficiently good in each of the parallel and crossed Nicol configurations.

There has also been a problem that iodine-type polarizers do not have sufficient durability and two pieces of such polarizers in the crossed Nicol configuration can cause polarization dropout at long wavelengths and can be discolored red when placed in a heated environment. About this problem, a polarizer containing an appropriate amount of zinc ions is proposed (for example, Japanese Patent Nos. 1308919 and 1606999 and JP-A No. 2002-35512). These patent literatures disclose that long wavelength polarization dropout can be prevented when polarizers are allowed to stand under high temperature conditions. According to these patent literatures, however, it is needed to make polarizers contain zinc ions, and thus there are problems about the zinc precipitate on the surface of polarizers, the complicated control of concentration, and skin irritation.

DISCLOSURE OF INVENTION

It is an object of the invention to provide a polarizer having good hue. It is another object of the invention to provide a polarizer having good hue and good durability.

It is also another object of the invention to provide a method of manufacturing a polarizer having good hue. It is still another object of the invention to provide a method of manufacturing a polarizer having good hue and good durability.

It is a further object of the invention to provide a polarizing plate using such a polarizer. It is a further object of the invention to provide an optical film using such a polarizer or polarizing plate and to provide an image display using such a polarizer, polarizing plate or optical film.

In order to solve the above problems, the inventors have made active investigations and have finally found that the polarizer and the method of manufacturing a polarizer as described below can fulfill the above objects, thereby completing the invention.

That is, the invention is directed to a polarizer: comprising a polyvinyl alcohol-based film which is at least dyed with at least iodine and uniaxially stretched, having a single transmittance of 43% or more, a polarizing efficiency of 99.9% or more, and a dichroic ratio of 30 or more, wherein the dichroic ratio is calculated from a parallel transmittance (Tp) and a crossed transmittance (Tc) at a wavelength of 440 nm according to the following formula:

dichroic ratio=$\{ \log_{10}(1/k_2)\}/\{ \log_{10}(1/k_1)\}$, where $k_1 = \frac{1}{2} \cdot \sqrt{2} \times [(Tp+Tc)^{1/2} + (Tp-Tc)^{1/2}]$ and $k_2 = \frac{1}{2} \cdot \sqrt{2} \times [(Tp+Tc)^{1/2} - (Tp-Tc)^{1/2}]$.

In iodine-dyed and uniaxially-stretched polyvinyl alcohol-based films (polarizers), the adsorbed iodine forms polyiodine complexes of $I_3-$ and $I_5-$. $I_3-$ has a broad absorption peak at about 470 nm, and $I_5-$ has a broad absorption peak in the wavelength range from 600 to 700 nm. In conventional polarizers, however, the alignment of $I_3-$ is poor at short wavelengths from 400 nm to 500 nm, and thus conventional polarizers have low dichroic ratios in the wavelength range from 400 nm to 500 nm. Therefore, conventional polarizers have low transmittance and show a yellow color at wavelengths from 400 nm to 500 nm with respect to the transmission spectrum in the parallel Nicol configuration and have high transmittance and show a blue color at wavelengths from 400 nm to 500 nm with respect to the transmission spectrum in the crossed Nicol configuration.

The low dichroic ratio of the polarizer is attributable to the poor alignment of $I_3-$. Thus, if the alignment of $I_3-$ is improved and the dichroic ratio is increased, the polarizer can have improved its hue. Since cold-cathode fluorescent tubes especially for use in liquid crystal displays have bright lines at wavelengths of 440 nm, 550 nm and 610 nm, the short wavelength properties of iodine-type polarizers, generally, are particularly important at 440 nm.

It is conceived that if the dichroic ratio is 30 or more at a wavelength of 440 nm, the above problem with hue can be solved. Conventionally, however, polarizers are required to lower single transmittance in order to have a dichroic ratio of 30 or more at a wavelength of 440 nm. Such a lowered single transmittance is not preferred in terms of optical properties. The single transmittance is preferable 43% or more in terms of optical properties. Conventionally, it has been impossible to coexistence the dichroic ratio at a wavelength of 440 nm to 30 or more and the simple transmittance of 43% or more.

The polarizer of the invention has good alignment of $I_3-$, a single transmittance of 43% or more, a polarizing efficiency of 99.9% or more, and a dichroic ratio of 30 or more at a wavelength of 440 nm. The polarizer of the invention has good optical properties and improved hue neutral in both parallel and crossed Nicol configurations. The single transmittance is 43% or more, preferably 43.5% or more. The polarizing efficiency is 99.9% or more, preferably 99.92% or more. The dichroic ratio at a wavelength of 440 nm is 30 or more, preferably 34 or more. Conventionally, it has been difficult to obtain a dichroic ratio of 30 or more at a wavelength of 440 nm, because it has been difficult to improve the alignment of $I_3-$.

The polarizer preferably has an iodine content of 1.5 to 2.5% by weight and a potassium content of 0.2 to 0.6% by weight.

Polarizers are discolored red when kept at high temperatures. It is conceived that $I_5-$ having absorption at long wavelengths is decomposed or lowered in alignment. Polarizers are produced by stretching iodine-dyed polyvinyl alcohol-based films in an aqueous solution containing, for example, boric acid and potassium iodide. In this process, the transmittance is determined by the stretch ratio, the iodine concentration or the like, while the polarizing efficiency varies with the concentration of potassium iodide. That is, it is conceived that the polarizing efficiency increase with the amount of potassium iodide in a polarizer, but if the amount of potassium iodide is increased too much, the polarizer is discolored red when kept at high temperatures.

In this point of view, the content of iodine in the polarizer is preferably from 1.5 to 2.5% by weight, more preferably from 1.7 to 2.4% by weight, still more preferably from 1 to 2.3% by weight. If the iodine content is too high, the polarizing plate has insufficient durability and is easily discolored red at high temperatures. If the iodine content is too low, the polarizing efficiency is easily lowered. The content of potassium in the polarizer is preferably from 0.2 to 0.6% by weight, more preferably from 0.3 to 0.58% by weight, still more preferably from 0.4 to 0.57% by weight. If the potassium content is too high, the polarizing plate has insufficient durability and is easily discolored red at high temperatures. If the potassium content is too low, the polarizing efficiency is easily lowered.

The invention is also directed to a method of manufacturing a polarizer, comprising the steps of:

dyeing a polyvinyl alcohol-based film with iodine;

uniaxially stretching the iodine-dyed polyvinyl alcohol-based film in an aqueous boric acid solution containing potassium iodide at a concentration of 4% by weight or more; and subsequently washing the film with an aqueous solution containing an iodide at a concentration of 0.8% by weight or more.

In the method of manufacturing the polarizer, the aqueous boric acid solution (a stretching bath) used in the uniaxially stretching step preferably contains the iodide at a concentration of 4 to 12% by weight.

In the method of manufacturing the polarizer, the aqueous iodide solution (a washing bath) used in the washing step preferably contains the iodide at a concentration of 0.8 to 2.5% by weight.

Typically, polarizers are produced by dyeing a polyvinyl alcohol-based film with iodine and uniaxially stretching. After the polyvinyl alcohol-based film is dyed with iodine, $I_5-$, which gives a blue color, is generated with stretching the film or immersing the film in an aqueous boric acid solution. On the other hand, when the polarizer is immersed in an aqueous solution of an iodide such as potassium iodide to be impregnated with iodine ions, $I_3-$ is generated to give neutral hue. Since $I_3-$ is relatively poor in alignment, in comparison with $I_5-$, the dichroic ratios of polarizers prepared by conventional manufacturing methods are relatively low at short wavelengths and relatively high at long wavelengths.

The method of manufacturing polarizer according to the invention is based on the finding that the alignment of the polyiodine complex is better in the case that the polyvinyl alcohol-based film is aligned by stretching or the like after the polyiodine complex is generated than in the case that the polyiodine complex is generated after the polyvinyl alcohol-based film is aligned by stretching or the like in the conventional manner. Specifically, the polyvinyl alcohol-based film is stretched after a large amount of $I_3-$ is generated in the aqueous boric acid solution (the stretching bath) containing an iodide at a concentration of 4% by weight or more, $I_3-$ having good alignments is performed and high dichroic ratios is obtained at short wavelengths from 400 nm to 500 nm. In addition, the film is washed in the aqueous solution (the washing bath) of an iodide at a concentration of 0.8% by weight or more so that excess $I_3-$ is washed off-and the film retain $I_3-$ in good alignments, and thus the amounts of $I_3-$ and $I_5-$ is controlled. If the concentration of the iodide in the stretching bath or the washing bath is too low, the amount of $I_3-$ is too small, and thus the polarizing plate has a blue hue. The concentration of the iodide in the stretching bath is 4% by weight or more, preferably 4.5% by weight or more, more preferably 5% by weight or more. The concentration of the iodide in the washing bath is 0.8% by weight or more, preferably 1.0% by weight or more, more preferably 1.2% by weight or more.

On the other hand, if the concentration of the iodide in the stretching bath or the washing bath is higher than a certain level, it is difficult to obtain a further effect, and the polarizer has a yellow hue and the hue in the crossed Nicol configuration tends to be discolored red when kept in a high temperature atmosphere for a long time. The concentration of the iodide in the stretching bath is generally 15% by weight or less and preferably 12% by weight or less, preferably 11% by weight or less, more preferably 10% by weight or less, from the above point of view. The concentration of the iodide in the washing bath is generally 6% by weight or less and preferably 2.5% by weight or less, preferably 2.3% by weight or less, more preferably 2% by weight or less.

The method of manufacturing polarizer comprises the step of drying after the step of washing with the aqueous iodide solution. The drying step is preferably performed at 70° C. or less in order to produce a highly durable polarizer.

In the method of manufacturing the polarizer, the iodide is preferably potassium iodide. Examples of the iodide for use in the stretching or washing bath include a variety of iodides such as potassium iodide, sodium iodide, lithium iodide, zinc iodide, calcium iodide, and cobalt iodide. In particular, potassium iodide is preferred because it hardly precipitates on the surface of films. When an iodide other than potassium iodide is used, the amount of the iodide is preferably adjusted such that the concentration of the iodine ions in the polyvinyl alcohol-based film is equal to the corresponding concentration in the case of potassium iodide, depending on the molecular weight and dissociation constant of the iodide, and the degree of swelling of the polyvinyl alcohol-based film or the like.

In the method of manufacturing the polarizer, the iodine dyeing step may be performed together with a stretching pre-step. While the stretching may be performed in a pre-step before the step in the aqueous boric acid solution (the stretching bath), the stretching in the pre-step is preferably performed together with the iodine dyeing step in terms of preventing wrinkling of the film swelling in water.

The polarizer obtained by the above manufacturing method preferably has a single transmittance of 43% or more, a polarizing efficiency of 99.9% or more, and a dichroic ratio of 30 or more in terms of good hue, wherein the dichroic ratio is calculated from a parallel transmittance (Tp) and a crossed transmittance (Tc) at a wavelength of 440 nm according to the following formula:

dichroic ratio={ $\log_{10}(1/k_2)$}/{ $\log_{10}(1/k_1)$}, where $k_1 = \frac{1}{2} \cdot \sqrt{2} \times [(Tp+Tc)^{1/2} + (Tp-Tc)^{1/2}]$ and $k_2 = \frac{1}{2} \cdot \sqrt{2} \times [(Tp+Tc)^{1/2} - (Tp-Tc)^{1/2}]$.

In terms of durability, the polarizer obtained by the above manufacturing method preferably has an iodine content of 1.5 to 2.5% by weight and a potassium content of 0.2 to 0.6% by weight.

The invention is also directed to a polarizer obtained by the above manufacturing method.

The invention is also directed to a polarizing plate comprising the above polarizer and a transparent protective film provided on at least one side of the polarizer. The polarizing plate preferably has the above characteristics (a single transmittance of 43% or more, a polarizing efficiency of 99.9% or more and a dichroic ratio of 30 or more at a wavelength of 440 nm).

The invention is also directed to an optical film comprising the above polarizer or the above polarizing plate and at least one other optical layer laminated with the polarizer or the polarizing plate.

The invention is also directed to an image display comprising at least one piece of the above polarizer, the above polarizing plate or the above optical film.

BEST MODE FOR CARRYING OUT THE INVENTION

Polyvinyl alcohol or any derivative thereof may be used as a material for the polyvinyl alcohol-based film suited for the polarizer of the invention. Examples of the polyvinyl alcohol derivative include polyvinyl formal, polyvinyl acetal, and those modified with an olefin such as ethylene and propylene, an unsaturated carboxylic acid such as acrylic acid, methacrylic acid and crotonic acid, an alkyl ester thereof, acrylamide, or the like. The polyvinyl alcohol having a degree of polymerization of from about 1,000 to about 10,000 and a saponification degree of from about 80 to about 100% by mole, is generally used.

The polyvinyl alcohol-based film may contain any additive such as a plasticizer. Examples of the plasticizer include polyols such as glycerol, diglycerol, triglycerol, ethylene glycol, propylene glycol, and polyethylene glycol and condensation products thereof. While the amount of the plasticizer is not to be limited, the content of the plasticizer in the polyvinyl alcohol-based film is preferably 20% by weight or less.

In general, an about 30 to 150 μm-thick unstretched polyvinyl alcohol-based film is used.

The polyvinyl alcohol-based film (unstretched film) is subjected to a process including the steps of: dyeing the polyvinyl alcohol-based film with iodine; uniaxially stretching the iodine-dyed polyvinyl alcohol-based film in an aqueous boric acid solution (a stretching bath) containing an iodide at a concentration of 4% by weight or more; and then washing the film with an aqueous solution (a washing bath) of an iodide at a concentration of 0.8% by weight or more.

The iodine dyeing process is generally performed by immersing the polyvinyl alcohol-based film in an iodine solution. If an aqueous iodine solution is used as the iodine solution, the aqueous iodine solution contains iodine and iodine ions derived from an iodide such as potassium iodide serving as a dissolution aid. The iodine concentration is preferably from about 0.01 to about 0.5% by weight, more preferably from 0.02 to 0.4% by weight, still more preferably from 0.2 to 0.38% by weight, further more preferably from 0.2 to 0.35% by weight. The iodide (such as potassium iodide) concentration is preferably from about 0.01 to about 10% by weight, more preferably from 0.02 to 8% by weight.

In the iodine dyeing process, a temperature of the iodine solution is generally of about 20 to 50° C., preferably of 25 to 40° C. The immersion time period is generally from about 10 to about 300 seconds, preferably from 20 to 240 seconds.

Before the iodine dyeing process, the polyvinyl alcohol-based film may be immersed in water for water-washing. If the polyvinyl alcohol-based film is washed with water, surface stain or antiblocking agents can be washed off from the polyvinyl alcohol-based film. In addition, the polyvinyl alcohol-based film may be allowed to swell so that unevenness such as uneven dyeing can be effectively prevented.

The iodine-dyed polyvinyl alcohol-based film is then uniaxially stretched of an aqueous boric acid solution (a stretching bath) containing an iodide. As described above, an iodide concentration of the stretching bath is of 4% by weight or more, preferably of 4 to 12% by weight, more preferably of 4.5 to 11% by weight, still more preferably of 5 to 10% by weight.

A boric acid concentration of the stretching bath is generally of 2 to 8% by weight, preferably of 2.5 to 7% by weight, more preferably of 3 to 6% by weight. If the boric acid concentration is too low, the polarizing efficiency tends to be degraded. If the boric acid concentration is too high, stretching hardly to perform.

In the uniaxial stretching process, the iodine-dyed polyvinyl alcohol-based film is immersed in the stretching bath. The stretch ratio is generally from about 4 to about 7, preferably from 5 to 6.8, more preferably from 5.5 to 6.5. The stretched film preferably has a thickness of about 5 to about 80 μm.

The stretching in the stretching bath may be performed in a multistage manner. Stretching may also be performed before the stretching in the stretching bath. If stretching is performed before the stretching in the stretching bath, the stretching in the stretching bath should be controlled such that the total stretch ratio with respect to the unstretched film is 4 to 7 after the stretching in the stretching bath. A stretch ratio in the pre-stretching before the stretching in the stretching bath is of 4 or less, specifically of 2.8 to 3.8. The pre-stretching before the stretching in the stretching bath is preferably performed together with the iodine dyeing step.

A temperature of the aqueous boric acid solution (the stretching bath) is not to be limited, for example, of 30° C. or higher, preferably of 40 to 85° C. The immersion time period is generally from 10 to 1,200 seconds, preferably from 30 to 600 seconds.

The film is then subjected to the step of washing with the aqueous iodide solution. The aqueous iodide solution (the washing bath) has an iodide concentration of 0.8% by weight or more, as described above, preferably of 0.8 to 2.5% by weight, more preferably of 0.8 to 2.3% by weight, still more preferably of 0.8 to 2.1% by weight. The temperature of the aqueous iodide solution (the washing bath) is generally from about 15 to about 60° C., preferably from 25 to 40° C. The immersion time period is generally from about 1 to about 120 seconds, preferably from 3 to 90 seconds.

The film may be then subjected to the drying step. The drying step is preferably performed at 70° C. or lower, more preferably at 60° C. or lower, more preferably at 45° C. or lower. The drying time period is preferably 10 minutes or less, more preferably 5 minutes or less.

The above-described polarizer may be used as a polarizing plate with a transparent protective film prepared at least on one side thereof using a usual method. The transparent protective film may be prepared as an application layer by polymers, or a laminated layer of films. Proper transparent materials may be used as a transparent polymer or a film material that forms the transparent protective film, and the material having outstanding transparency, mechanical strength, heat stability and outstanding moisture interception property, etc. may be preferably used. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned. The transparent protective film may also be in the form of a cured layer of thermosetting resins or ultraviolet curing resins, such as acrylic resins, urethane resins, acrylic urethane resins, epoxy resins, and silicone resins.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. These films have small retardation and small photoelastic coefficient, and thus prevent defects such as unevenness which would otherwise be caused by distortion of the polarizing plate, and also have small water vapor permeability, and thus have good durability under moistening conditions.

While the thickness of the protective film may be specified as needed, generally, is from about 1 to about 500 µm in terms of strength, processibility such as handleability, and thin layer formability, preferably from 1 to 300 µm, more preferably from 5 to 200 µm.

Moreover, it is preferable that the protective film may have as little coloring as possible. Accordingly, a protective film having a retardation value in a film thickness direction represented by $Rth=[(nx+ny)/2-nz]\times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm through +75 nm in a thickness direction. The retardation value (Rth) in a thickness direction is preferably −80 nm through +60 nm, and especially preferably −70 nm through +45 nm.

As a transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex-structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight part that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 μm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective film separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid: crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystalline materials, such as liquid crystal polymer; and films on which an alignment layer of a liquid crystalline material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light-from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported(PCF350 manufactured by Nitto Denko CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure sensitive adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure sensitive adhesive layer may also be prepared for adhesion with other members, such as a liquid crystal cell etc. As pressure sensitive adhesive that forms pressure sensitive adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, a pressure sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure sensitive adhesive layer that contains fine particle and shows optical diffusion nature.

Proper method may be carried out to attach a pressure sensitive adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure sensitive adhesive layer is once formed on a separator, as mentioned above, and is then transferred on a polarizing plate or an optical film may be mentioned.

A pressure sensitive adhesive layer may also be prepared on one side or both sides of a polarizing plate or an optical film as a layer in which pressure sensitive adhesives with different composition or different kind etc. are laminated together. Moreover, when pressure sensitive adhesive layers are prepared on both sides, pressure sensitive adhesive layers that have different compositions, different kinds or thickness, etc. may also be used on front side and backside of a polarizing plate or an optical film. Thickness of a pressure sensitive adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure sensitive adhesive layer to prevent contamination etc., until it is practically used. Thereby, it can be prevented that foreign matter contacts pressure sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing. property may be given to the above-mentioned each layer, such as a polarizer for a polarizing plate, a transparent protective film and an optical film etc. and a pressure sensitive adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or-more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The invention is more specifically described by means of Examples and Comparative Examples below. In each example, "%" means % by weight. Concerning the stretching bath and the washing bath, each concentration refers to the concentration of each solute in the whole of the corresponding solution.

Example 1

An 80 μm-thick polyvinyl alcohol film (with an average degree of polymerization of 2400 and a degree of saponification of 99.9%) was uniaxially stretched to 3 times between rolls at different velocity ratios, while it was immersed at 30° C. for 60 seconds in an aqueous iodine solution with an iodine concentration of 0.3% and a potassium iodide concentration of 2% to be dyed. The film was then stretched such that the total stretch ratio reached 6, while immersed at 60° C. for 40 seconds in an aqueous solution (a stretching bath) with a boric acid concentration of 4% and a potassium iodide concentration of 5%. The film was then immersed to be washed at 30°

C. for 10 seconds in an aqueous solution of 1.5% potassium iodide (a washing bath). The film was then dried at 50° C. for 4 minutes to give a polarizer. Surface-saponified 80 μm-thick triacetyl cellulose films were adhered to both sides of the resulting polarizer with a polyvinyl alcohol-based adhesive and then dried at 60° C. for 4 minutes to form a polarizing plate.

Example 2

A polarizer was prepared using the process of Example 1 except that an aqueous solution with a boric acid concentration of 4% and a potassium iodide concentration of 10% was alternatively used as the stretching bath. And a polarizing plate was prepared in the same manner of Example 1.

Example 3

A polarizer was prepared using the process of Example 1 except that an aqueous solution with a boric acid concentration of 4% and a potassium iodide concentration of 10% was alternatively used as the stretching bath and an aqueous solution with a potassium iodide concentration of 2% was alternatively used as the washing bath. And a polarizing plate was prepared in the same manner of Example 1.

Example 4

A polarizer was prepared using the process of Example 1 except that an aqueous solution with a boric acid concentration of 4% and a potassium iodide concentration of 7% was alternatively used as the stretching bath and an aqueous solution with a potassium iodide concentration of 1% was alternatively used as the washing bath. And a polarizing plate was prepared in the same manner of Example 1.

Example 5

A polarizer was prepared using the process of Example 1 except that an aqueous solution with a boric acid concentration of 4% and a potassium iodide concentration of 5% was alternatively used as the stretching bath and an aqueous solution with a potassium iodide concentration of 1% was alternatively used as the washing bath. And a polarizing plate was prepared in the same manner of Example 1.

Example 6

A polarizer was prepared using the process of Example 1 except that an aqueous solution with a boric acid concentration of 4% and a potassium iodide concentration of 15% was alternatively used as the stretching bath. And a polarizing plate was prepared in the same manner of Example 1.

Example 7

A polarizer was prepared using the process of Example 1 except that an aqueous solution with a potassium iodide concentration of 3% was alternatively used as the washing bath. And a polarizing plate was prepared in the same manner of Example 1.

Example 8

A polarizer was prepared using the process of Example 1 except that an aqueous iodine solution (controlled to be single transmittance of 42.5%) with an iodine concentration of 0.4% and a potassium iodide concentration of 3% was alternatively used as the aqueous iodine solution. And a polarizing plate was prepared in the same manner of Example 1.

Example 9

A polarizer was prepared using the process of Example 1 except that an aqueous solution with a boric acid concentration of 4% and a potassium iodide concentration of 2% was alternatively used as the stretching bath and an aqueous solution with a potassium iodide concentration of 5% was alternatively used as the washing bath. And a polarizing plate was prepared in the same manner of Example 1.

Example 10

A polarizer was prepared using the process of Example 1 except that an aqueous solution with a potassium iodide concentration of 2% was alternatively used as the washing bath and then the drying was performed at 30° C. for 5 minutes. And a polarizing plate was prepared in the same manner of Example 1.

Comparative Example 1

A polarizer was prepared using the process of Example 1 except that an aqueous solution with a boric acid concentration of 4% and a potassium iodide concentration of 3% was alternatively used as the stretching bath. And a polarizing plate was prepared in the same manner of Example 1.

Comparative Example 2

A polarizer was prepared using the process of Example 1 except that an aqueous solution with a potassium iodide concentration of 0.5% was alternatively used as the washing bath. And a polarizing plate was prepared in the same manner of Example 1.

Comparative Example 3

A polarizer was prepared using the process of Example 1 except that a pure water was alternatively used as the washing bath. And a polarizing plate was prepared in the same manner of Example 1.

Comparative Example 4

A polarizer was prepared using the process of Example 1 except that an aqueous solution with a boric acid concentration of 4% and a potassium iodide concentration of 3% was alternatively used as the stretching bath and an aqueous solution with a potassium iodide concentration of 3% was alternatively used as the washing bath. And a polarizing plate was prepared in the same manner of Example 1.

The polarizing plates prepared in Examples and Comparative Examples were each evaluated as follows. The results are shown in Table 1.

(Single Transmittance)

The transmittance of a single piece of the polarizing plate was measured using a spectrophotometer (Dot-3C manufactured by Murakami Color Research Laboratory). The single transmittance of the polarizing plate is a Y value determined through relative spectral responsivity correction with 2 degree(C light source) according to JIS Z 8701.

(Polarizing Efficiency)

The parallel transmittance (Tp) of the same two polarizing plates superimposed with their polarization axes arranged parallel and the crossed transmittance (Tc) of those superimposed with their polarization axes arranged perpendicular were measured, respectively, using the spectrophotometer, and the polarizing efficiency was calculated using the formula below.

Polarizing efficiency (%)=√{(To−Do)/(Patch)}×100

The parallel transmittance (Tp) and the crossed transmittance (Tc) are each a Y value determined through relative spectral responsivity correction with 2 degree(C light source) according to JIS Z 8701.

(Dichroic Ratio at Wavelength of 440 nm)

The dichroic ratio was calculated from the parallel transmittance (Tp) and crossed transmittance (Tc) of the polarizing plate at a wavelength of 440 nm according to the following formula:

dichroic ratio={ $\log_{10}(1/k_2)$ }/{ $\log_{10}(1/k_1)$ }, wherein $k_1 = \frac{1}{2} \cdot \sqrt{2} \times [(Tp+T)^{1/2} + (Tp-Tc)^{1/2}]$ and $k_2 = \frac{1}{2} \cdot \sqrt{2} \times [(Tp+Tc)^{1/2} - (Tp-Tc)^{1/2}]$ (Contents of Iodine and Potassium in Polarizer)

Using the fundamental parameter method (FP method), the contents (%) of iodine and potassium in the polarizer were calculated from X-ray fluorescence intensities which were measured with a X-ray fluorescence spectrometer (ZSX 100e manufacture by Rigaku Corporation).

(Hue (Δab))

Using a spectrophotometer (Dot-3C manufactured by Murakami Color Research Laboratory), a value and b value in Hunter color system were determined(C light source). Δab was calculated from the values according to the following formula:

$\Delta ab = \sqrt{\{(\text{parallel } a \text{ value-crossed } a \text{ value})^2 + (\text{parallel } b \text{ value-crossed } b \text{ value})^2\}}$ Δab indicates a change in chromaticity depending on a change in brightness of color. The smaller the value is, the better color reproducibility. In a preferred mode of the invention, Δab is 5 or less.

(Durability: Evaluation of Red Discoloration by Heating)

After the polarizing plate was kept at 85° C. for 24 hours, the hue in the crossed Nicol configuration was visually evaluated using the following criteria:

○○: no red discoloration
○: a little red discoloration
▲: some red discoloration
×: significant red discoloration

TABLE 1

| | Potassium Iodide Concentration (%) | | Single | Polarizing | Dichroic Ratio at | Iodine Content of |
|---|---|---|---|---|---|---|
| | Stretching Bath | Washing Bath | Transmittance (%) | efficiency (%) | Wavelength of 440 nm | Polarizer (%) |
| Example 1 | 5 | 1.5 | 44.0 | 99.97 | 36.5 | 1.91 |
| Example 2 | 10 | 1.5 | 44.3 | 99.97 | 38.6 | 2.01 |
| Example 3 | 10 | 2 | 44.1 | 99.98 | 44.4 | 2.42 |
| Example 4 | 7 | 1 | 44.0 | 99.94 | 34.5 | 1.52 |
| Example 5 | 5 | 1 | 44.0 | 99.95 | 34.8 | 1.46 |
| Example 6 | 15 | 1.5 | 44.3 | 99.97 | 40.3 | 2.64 |
| Example 7 | 5 | 3 | 44.0 | 99.96 | 36.5 | 2.99 |
| Example 8 | 5 | 1.5 | 42.5 | 99.97 | 32.6 | 1.80 |
| Example 9 | 2 | 5 | 44.0 | 99.95 | 31.4 | 2.78 |
| Example 10 | 5 | 2 | 43.9 | 99.95 | 40.6 | 2.21 |
| Comparative Example 1 | 3 | 1.5 | 44.2 | 99.80 | 29.4 | 1.81 |
| Comparative Example 2 | 5 | 0.5 | 44.4 | 99.86 | 27.6 | 1.11 |
| Comparative Example 3 | 5 | 0 | 43.9 | 99.55 | 21.5 | 0.91 |
| Comparative Example 4 | 3 | 3 | 44.1 | 99.92 | 28.5 | 2.70 |

| | Potassium Content of Polarizer (%) | Hue (NBS) | | | | | Red Discoloration by Heating |
|---|---|---|---|---|---|---|---|
| | | Parallel a Value | Parallel b Value | Crossed a Value | Crossed b Value | Δab | |
| Example 1 | 0.38 | −1.26 | 2.67 | 0.57 | −1.83 | 4.86 | ○○ |
| Example 2 | 0.42 | −1.15 | 2.89 | 0.63 | −1.56 | 4.79 | ○ |
| Example 3 | 0.56 | −1.08 | 3.24 | 0.45 | −1.05 | 4.55 | ○○ |
| Example 4 | 0.25 | −1.31 | 2.46 | 0.56 | −1.86 | 4.71 | ○○ |
| Example 5 | 0.24 | −1.33 | 2.32 | 0.57 | −2.20 | 4.90 | ○○ |
| Example 6 | 0.61 | −1.00 | 3.28 | 0.79 | −1.29 | 4.91 | ▲ |
| Example 7 | 0.74 | −1.08 | 3.49 | 0.56 | −1.04 | 4.82 | × |
| Example 8 | 0.36 | −0.84 | 3.94 | 0.46 | −0.59 | 4.71 | ○○ |
| Example 9 | 0.66 | −1.10 | 3.88 | 0.45 | −0.83 | 4.96 | × |
| Example 10 | 0.48 | −1.24 | 2.96 | 0.54 | −1.60 | 4.90 | ○○ |
| Comparative Example 1 | 0.34 | −1.30 | 2.60 | 0.75 | −2.51 | 5.51 | ○○ |

TABLE 1-continued

| | | | | | | | |
|---|---|---|---|---|---|---|---|
| Comparative Example 2 | 0.12 | −1.47 | 2.63 | 1.47 | −4.64 | 7.84 | ○○ |
| Comparative Example 3 | 0.06 | −0.70 | 0.84 | 6.18 | −37.65 | 39.10 | ○○ |
| Comparative Example 4 | 0.63 | −1.19 | 3.62 | 0.37 | −2.28 | 6.10 | ▲ |

Table 1 indicates that the polarizer or polarizing plate having a single transmittance of 43% or more, a polarizing efficiency of 99.9% or more and a 440 nm dichroic ratio of 30 or more show good hue. As a result of comparing Examples 1 to 5 and 8 with Examples 6, 7 and 9, it is apparent that red discoloration by heating is inhibited and good durability is obtained to control the contents of iodine to 1.5 to 2.5% by weight and potassium to 0.2 to 0.6% by weight, respectively.

Such a polarizer can be obtained by the process including the steps of uniaxially stretching the film in an aqueous boric acid solution containing potassium iodide at a concentration of 4% by weight or more and then washing it with an aqueous solution of potassium iodide at a concentration of 0.8% by weight or more. If the potassium iodide concentration of the aqueous boric acid solution is from 4 to 12% by weight and the concentration of the aqueous potassium iodide solution is from 0.8 to 2.5% by weight, the resulting polarizer or polarizing plate has good durability.

INDUSTRIAL APPLICABILITY

The polarizer of the invention and the polarizer produced by the manufacturing method of the invention are suitable and useful for polarizing plates and optical films using a polarizing plate or the like and can be applied to image displays such as liquid crystal displays, organic EL displays and PDPs.

The invention claimed is:

1. A method of manufacturing polarizer, comprising the steps of:

dyeing a polyvinyl alcohol-based film with iodine;

uniaxially stretching the iodine-dyed polyvinyl alcohol-based film in an aqueous boric acid solution containing an iodide at a concentration of 4 to 12% by weight; and subsequently washing the film with an aqueous solution containing an iodide at a concentration of 0.8 to 2.5% by weight;

wherein the resulting polarizer has a single transmittance of 43% or more, a polarizing efficiency of 99.9% or more, and a dichroic ratio of 30 or more, wherein the dichroic ratio is calculated from a parallel transmittance (Tp) and a crossed transmittance (Tc) at a wavelength of 440 nm according to the following formula:

dichroic ratio=$\{\log_{10}(1/k_2)\}/\{\log_{10}(1/k_1)\}$, where $k_1 = \frac{1}{2} \cdot \sqrt{2} \times [(Tp+Tc)^{1/2} + (Tp-Tc)^{1/2}]$ and $k_2 = \frac{1}{2} \cdot \sqrt{2} \times [(Tp+Tc)^{1/2} - (Tp-Tc)^{1/2}]$, and, an iodine content is of 1.5 to 2.5% by weight and a potassium content is of 0.2 to 0.6% by weight.

2. The method of manufacturing polarizer according to claim 1, wherein the iodide is potassium iodide.

3. The method of manufacturing polarizer according to claim 1, wherein the iodine dyeing step is performed together with a stretching pre-step.

* * * * *

UNITED STATES PATENT AND TRADEMARK OFFICE
CERTIFICATE OF CORRECTION

| | | |
|---|---|---|
| PATENT NO. | : 7,651,643 B2 | Page 1 of 1 |
| APPLICATION NO. | : 10/553958 | |
| DATED | : January 26, 2010 | |
| INVENTOR(S) | : Saiki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this

Twenty-eighth Day of December, 2010

David J. Kappos
*Director of the United States Patent and Trademark Office*